Nov. 5, 1935. A. J. VAN PESKI 2,019,772
METHOD FOR TREATING MINERAL OIL DISTILLATES
Filed Oct. 7, 1932
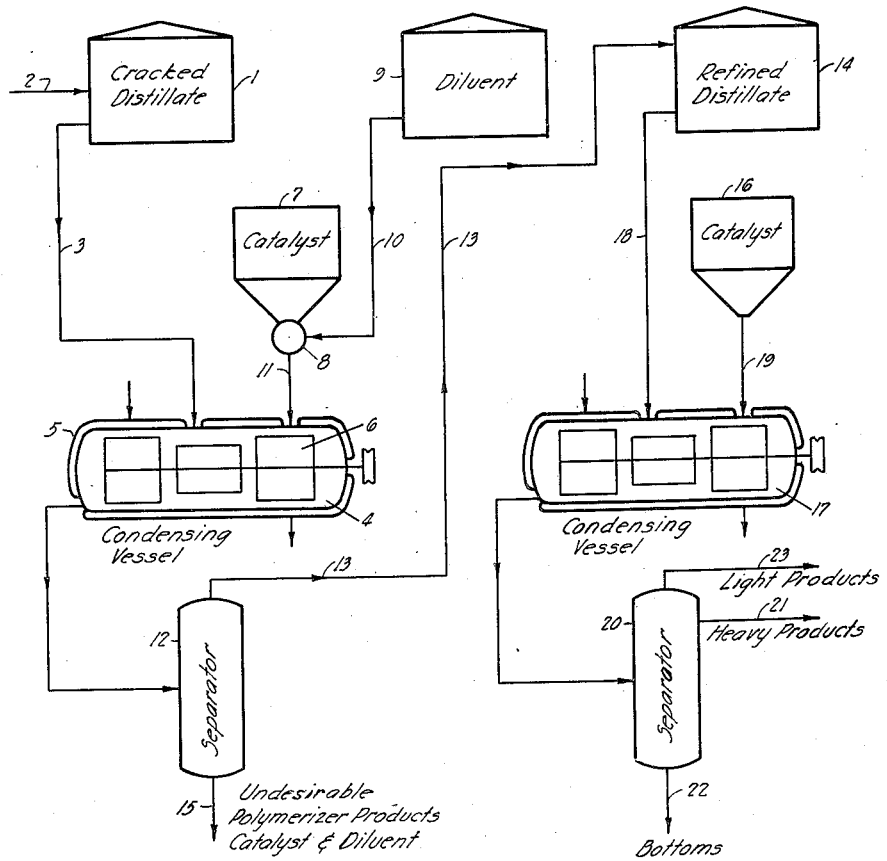
Inventor: Adrianus Johannes Van Peski
By his Attorney:

Patented Nov. 5, 1935

2,019,772

UNITED STATES PATENT OFFICE 2,019,772

METHOD FOR TREATING MINERAL OIL DISTILLATES

Adrianus Johannes van Peski, Bussum, Netherlands, assignor to Shell Development Company, San Francisco, Calif., a corporation of Delaware Application October 7, 1932, Serial No. 636,682
In the Netherlands October 8, 1931

3 Claims. (Cl. 196—78)

This invention relates to the synthetic mineral oils and is particularly concerned with the production of the oils obtained by condensation and/or polymerization of mineral oil distillates by means of suitable catalysts.

The general method of this type of treatment consists of subjecting a mineral oil distillate, containing certain percent of the unsaturated compounds (aliphatic or cylic), for a sufficient period of time, to a polymerizing action of suitable catalytic compounds under proper conditions of temperature and pressure, and then separating by some physical means the desired portion of the treated material. It was noted by those engaged in this work, that although the products of polymerization could invariably be produced by the above outlined method, the properties of the polymers were subject to wide variations depending upon the raw material subjected to treatment; it was noted, furthermore, that when products of cracking were treated by this method satisfactory lubricating oils could be obtained only from the cracked products derived from the high boiling mineral oil materials containing not less than 30% of paraffin wax, as disclosed, for example, in the British Patent No. 355,214. This limitation has excluded most of the naturally occurring petroleum from being a suitable source of the lubricating oils produced by the above outlined method.

It is an object of this invention to provide a new improved method for producing the high grade synthetic oils, such as lubricating, transformer, etc., from any source of mineral oil whatever.

It is another object of this invention to provide a method whereby mineral oil distillates suitable for the old treatment are made to produce polymerized products of better quality and/or in greater yields.

It is also an object of my invention to effect the economy in quantity of the required catalyst.

The deficiencies of the synthetic oils derived from certain sources, such as oils having low wax content, were known for some time and usually may comprise a low stability against oxidation, steep viscosity-temperature curves, uneconomical consumption of catalysts, etc.

I have discovered that the cracked distillates derived from the wax-free oils, or from the oils containing less than 30% wax, can be successfully used for producing high grade synthetic oils, provided they are freed to a certain extent from certain undesirable components prior to being subjected to final polymerization by one of the known methods.

I have also discovered that the yields of the polymerized synthetic oils resulting from the materials having wax content of not less than 30% can be increased and the quality of the oils further improved by my method of treatment.

According to my invention I pretreat the cracked distillate, either chemically treated or not, or any other material containing condensable and/or polymerizable hydrocarbons, to remove therefrom undesirable compounds by one of the hereinafter described methods, and then subject the pretreated material to the polymerizing and/or condensing action of a catalytic agent. The purpose of the pretreating step is to substantially remove certain groups of undesirable compounds or to substantially reduce their original content. I have found that these objectionable components of mineral oils can be effectively and selectively removed within the fractions boiling near the boiling temperatures of the known aromatic compounds (about ± 5° C. more or less). I have also found that these objectionable compounds respond, as far as I know, to various chemical treatments in the manner characteristic of the aromatic compounds, and/or are characterized by a high degree of chemical activity (shown, for example, by their readiness to condense and/or polymerize under suitable conditions).

I am not certain of the exact chemical nature of the compounds responsible for the detrimental effect upon the quality of the final polymerized material, although I have discovered and explained hereinbefore that some of them are closely associated with aromatic compounds while others are highly active unsaturated hydrocarbons. The term "undesirable compounds" is used in the appended claims to designate these groups of objectionable compounds, which, if present in the distillate to be polymerized, render the synthetized oils very sensitive to oxidation and temperature.

In carrying out my invention in practice, I may employ a large number of known physical and/or chemical methods to effect the removal of undesirable components from the material to be treated; the following methods may be used;

1. Removing by distillation fractions whose boiling ranges include the boiling temperatures of aromatic hydrocarbons, such as benzene and its homologues; for example, fractions boiling approximately within 75–85° C., or 106–116° C., corresponding respectively to benzene and toluene; or the fraction boiling from 133° C. to 147° C. corresponding to the xylene group, or any other similar fraction or fractions.

2. Extracting the undesirable components by a suitably controlled process, employing either liquid SO$_2$, or furfurol, or other extracting agents.

3. Polymerizing the undesirable components by means of such reagents as halides, principally chlorides, of iron, aluminum, tin, boron, zinc, antimony, etc., alone or in the presence of such diluents as nitrobenzene, nitromethane, dinitrotoluene, nitronaphthalene, etc. (nitro- or chloronitro-aliphatic or aromatic compounds in general), either individually or mixed and/or if desired, in the presence of NH₄Cl, halides of Cu, Ag, Th, Na, K, Ca, Hg and other metals, and separating the refined portion from the sludge by decantation or filtration, and, if desired, further removing the polymers by distillation; the partly spent catalyst can be separated in this case and reused; this pre-treating step may be characterized as a light, or less intensive, treatment normally requiring less catalyst and/or shorter time, than when the final condensation and/or polymerization is effected.

The objectionable components may also be caused to condense and/or polymerize into higher boiling compounds by subjecting the material to a suitable pressure in the absence of catalysts.

4. Polymerizing the undesirable components by means of sulfuric acid of suitable concentration and separating the sludge; in addition to this treatment the acid-treated and neutralized distillate can be fractionated to remove the polymers.

When actually practicing my process I may combine the various steps for more effective removal of undesirable compounds and in order to diminish the simultaneous removal of the valuable compounds. The combination treatments, as well as the treating conditions (temperatures, pressures, time and concentrations), most suitable for each individual case can be easily determined by experiments, and their selection is within the skill of those competent in the art.

The refined material substantially free of the objectionable components and containing a sufficient amount of unsaturated compounds and either neutral, or slightly acid or alkaline in reaction, is subjected to a polymerizing treatment by any known means, but preferably with AlCl₃, either alone or in the presence of a diluent, such as nitrobenzene.

Normally, this polymerizing treatment is more intensive than one of the similar pre-treating steps described above, and may differ from the latter by the increased concentration of the catalyst, longer time of contact, increased temperature and/or pressure, and other means known to those skilled in the art. After a sufficient contact with the catalyst, the treated oil is separated from the sludge and the treating agents, neutralized, if necessary, and the desired products separated by distillation under suitable pressure and with or without steam.

By following the steps described above I was able to utilize for making the high grade synthetic oils a large number of cracked distillates derived from either the asphalt base or paraffin base crudes, which either contained or were free of the paraffin wax. As I have explained hereinbefore the successful results were made possible by the removal of certain undesirable compounds responsive to the polymerizing action of the described catalysts from the oil just before it was subjected to the final polymerizing treatment.

As a result of my discovery I have found it greatly advantageous to produce synthetic oils of high qualities from the mineral oil distillates boiling below 80° centigrade, and preferably not above 75° C. The fractions boiling below this temperature usually require no physical treatment, but can be refined, if necessary to remove more active unsaturated hydrocarbons and then subjected to one of the well known polymerizing treatments followed by steps for separating the desired portion of the treated material.

My invention may be operated in the manner indicated in the drawing, which is a schematic flow diagram outlining one form of my process, it being understood that my invention is not limited to the details as shown therein but may be practiced with any other suitable apparatus.

Referring to the drawing, a cracked distillate from which the gasoline and similar light products have been removed is introduced into a surge or storage tank 1 through a pipe 2 and fed through a pipe 3 in the desired amount into a polymerizing or condensing chamber 4, provided with a temperature control jacket 5 and stirring paddles 6. A normally solid polymerizing catalyst of the type described above is charged into a hopper 7, mixed in a mixing valve 8 with a suitable nitro-organic diluent from a tank 9 and pipe 10, and introduced into the chamber 4 through a conduit 11. In this chamber the distillate is maintained under polymerizing conditions for the desired time at a temperature determined by that of the fluid in the jacket 5. After the requisite time has transpired, the contents are allowed to flow into a separator 12 in which the refined hydrocarbon distillate is separated from the polymerized undesirable constituents, the used catalyst, and the diluent, the refined distillate being withdrawn through a pipe 13, and led to a tank 14. The other constituents, spent catalyst and diluent may be withdrawn at 15.

Desired quantities of refined distillate from the tank 14 and of polymerizing catalyst from a hopper 16 are introduced into a second polymerizing or condensing chamber 17 through conduits 18 and 19, respectively, and contacted under polymerizing conditions for the desired time and allowed to flow into a separating apparatus 20 where the sludge, catalyst, and unpolymerized hydrocarbons are separated from the polymerized oil, the last being withdrawn through the outlet 21. The sludge and catalyst are withdrawn at 22 and the unpolymerized hydrocarbons may be withdrawn at 23, although it is possible to withdraw both the polymerized and unpolymerized oil through the conduit 21 and separate them in a separate distilling column.

In order to illustrate the effect and certain details of the improved treating process, the following examples are given:

Example 1

2 liters of the vapour phase cracked distillate (boiling range 25–109° C.), containing approximately 20% by weight of aromatic hydrocarbons, were polymerized with 50 cc. of nitro-methane and 25 g. of AlCl₃ by shaking during 24 hours at 20° C. After distilling off the non-polymerized constituents, and steam distilling the residue, a lubricating oil was obtained which on testing its oxidation stability at 250° C. yielded 27.1% by weight asphaltenes and 17% by weight coke.

When the same amount of this distillate was fractionated to remove benzene and toluene fractions and the remaining portions (containing 0.2% by weight aromatic hydrocarbons) were polymerized as before and subsequently subjected to distillation, a lubricating oil was obtained, which on testing its stability against oxidation at 250° C. produced neither asphaltenes nor coke.

In the above example the effect of the removal of fractions boiling near 80° C. and 111° C. has been strikingly demonstrated by the improvement in the oxidation stability of the polymerized oil.

*Example 2*

½ liter of the Dubbs cracked distillate (boiling range 25–250° C.), was treated for 16 hours at 20° C. with 20 g. of anhydrous AlCl₃ dissolved in 50 cc. of nitro-methane. After the treatment the nitro-methane-AlCl₃ layer was separated. The remaining hydrocarbon mixture was subsequently subjected whilst stirred to a polymerization treatment with 20 g. of anhydrous AlCl₃ during 16 hours at 20° C. After separation of the sludge formed during this treatment the hydrocarbon mixture was distilled with steam at 200° C. On testing the stability of the produced lubricating oil against oxidation only the traces of coke were formed.

When ½ liter of the same cracked distillate was subjected to a polymerization by AlCl₃ treatment under identical circumstances and without a pretreatment, a lubricating oil was obtained which on testing its stability against oxidation yielded approximately 5% by weight of carbon.

In this example the effect of a pre-treatment with AlCl₃ and a diluent has been shown to improve the oxidation stability of the resulting lubricating oil.

*Example 3*

188 g. of a vapour phase cracked distillate boiling up to 116° C. was polymerized with 20 g. of anhydrous AlCl₃ during 11 hours at 30° C. After separation of the formed sludge the obtained liquid was subjected to a steam distillation. 32 g. of a dark yellow oil was obtained which on oxidation during 3 hours at 300° C. yielded 38.1% by weight of asphaltenes.

When the same amount of this distillate was pre-treated with 5% by weight of sulphuric acid of 100% strength and 184 g. of the fraction of the obtained material boiling up to 160° C. was subsequently polymerized in the above described manner, 57.5 g. light coloured yellow oil was obtained after separation of the sludge and steam treatment, which oil on oxidation during 3 hours at 300° C. yielded only 2.2% by weight of asphaltenes.

Although only the sulfuric acid of 100% strength has been shown in the last example to produce the oil possessing a high stability against oxidation, it is obvious that the same acid of different concentrations can be successfully used for the same general purpose of pre-treating the oil to be polymerized for producing valuable synthetic oils. It is also evident that other reagents and/or acids, such as phosphoric acid, sulfonic acids (such as benzene sulfonic acid and its homologues) etc., can be used with advantage in preparing the oils for the final polymerization treatment in the process of manufacturing the synthetic oils.

In all three examples, as well as in numerous experiments not described in this specification, the lubricating oils produced by my method had flatter temperature-viscosity curves than the oils obtained from the materials which were not pre-treated in the described manner.

Having fully described my invention and the specific manner in which it can be practiced, I do not intend to limit myself to the particular treating procedures described hereinbefore, as a large number of variations are conceivable whereby the subject of my invention can be successfully practiced.

I claim as my invention:

1. In the process for producing improved synthetic oils by condensation and/or polymerization treatment of a cracked mineral oil distillate lighter than a lubricating oil and containing unsaturated hydrocarbons and undesirable compounds tending to produce on polymerization and/or condensation readily oxidizable synthetic oils, the steps of: substantially reducing the content of the undesirable compounds in said cracked distillate by condensing and/or polymerizing the said undesirable compounds by a light polymerizing treatment with a quantity of a normally solid polymerizing catalyst which quantity is not substantially greater than that necessary to remove the undesirable compounds without substantially removing the unsaturated hydrocarbons, and in the presence of a nitro-hydrocarbon which may be further substituted, substantially removing the polymers, catalyst and said nitro-hydrocarbon, and then polymerizing the remaining portion of the pre-treated oil containing unsaturated hydrocarbons in the absence of the diluent.

2. In the process for producing improved synthetic oils by condensation and/or polymerization treatment of a cracked mineral oil distillate lighter than a lubricating oil and containing unsaturated hydrocarbons, and undesirable compounds tending to produce on polymerization and/or condensation readily oxidizable synthetic oils, the steps of: substantially reducing the content of the undesirable compounds in said cracked distillate by condensing and/or polymerizing the said undesirable compounds by a light polymerizing treatment with a quantity of a normally solid polymerizing catalyst which quantity is not substantially greater than that necessary to remove the undesirable compounds without substantially removing the unsaturated hydrocarbons, and in the presence of a chloro-nitro-hydrocarbon, substantially removing the polymers, catalyst and said chloro-nitro-hydrocarbon, and then polymerizing the remaining portion of the pre-treated oil containing unsaturated hydrocarbons in the absence of the diluent.

3. In the process for producing improved synthetic oils by condensation and/or polymerization treatment of a cracked mineral oil distillate lighter than a lubricating oil and containing unsaturated hydrocarbons and undesirable compounds tending to produce on polymerization and/or condensation readily oxidizable synthetic oils the steps of substantially reducing the content of the undesirable compounds in the distillate by a preliminary refining polymerizing treatment with a small quantity of a fresh normally solid polymerizing catalyst in the presence of a diluent selected from the group: nitro-aliphatic and nitro-aromatic organic compounds, the quantity being not substantially greater than that necessary to remove the undesirable compounds without substantially reducing the content of the unsaturated hydrocarbons, removing the spent catalyst and polymers from the treated distillate, and then polymerizing the refined portion of the distillate into a more viscous oil by treatment with a greater quantity of the catalyst under polymerizing conditions.

ADRIANUS JOHANNES van PESKI.